(12) United States Patent
Shinohara

(10) Patent No.: US 9,197,783 B2
(45) Date of Patent: Nov. 24, 2015

(54) IMAGE FORMING APPARATUS

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Eiji Shinohara, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/072,048

(22) Filed: Nov. 5, 2013

(65) Prior Publication Data

US 2014/0192374 A1 Jul. 10, 2014

(30) Foreign Application Priority Data

Jan. 8, 2013 (JP) ................................ 2013-001323

(51) Int. Cl.
| | |
|---|---|
| *H04N 1/38* | (2006.01) |
| *G03G 15/00* | (2006.01) |
| *H04N 1/00* | (2006.01) |
| *G03G 21/00* | (2006.01) |

(52) U.S. Cl.
CPC .............. *H04N 1/38* (2013.01); *G03G 15/502* (2013.01); *G03G 21/00* (2013.01); *H04N 1/00896* (2013.01); *H04N 2201/0094* (2013.01); *H04N 2201/33307* (2013.01)

(58) Field of Classification Search
None
See application file for complete search history.

(56) References Cited

U.S. PATENT DOCUMENTS

| 8,693,912 | B2 * | 4/2014 | Fujiwara | 399/69 |
|---|---|---|---|---|
| 9,063,483 | B2 * | 6/2015 | Katayama | 1/1 |
| 2004/0080787 | A1 * | 4/2004 | Kakikawa et al. | 358/1.18 |
| 2005/0141906 | A1 * | 6/2005 | Murakami | 399/45 |
| 2005/0151997 | A1 * | 7/2005 | Murakami et al. | 358/1.16 |
| 2005/0191076 | A1 | 9/2005 | Dan | |
| 2006/0007468 | A1 * | 1/2006 | Tanaka | 358/1.14 |
| 2011/0222937 | A1 | 9/2011 | Yahata et al. | |
| 2011/0274445 | A1 | 11/2011 | Kabai | |
| 2012/0321335 | A1 * | 12/2012 | Fujiwara | 399/69 |
| 2013/0016376 | A1 * | 1/2013 | Hashidume et al. | 358/1.9 |

FOREIGN PATENT DOCUMENTS

| JP | 2005-249871 | 9/2005 |
|---|---|---|
| JP | 2011-186469 | 9/2011 |

OTHER PUBLICATIONS

Office Action of Notification of Reasons for Rejection for Japanese Patent Application No. 2013-001323 Dated Jan. 6, 2015, 9 pages.

\* cited by examiner

*Primary Examiner* — Hilina K Demeter
(74) *Attorney, Agent, or Firm* — Amin, Turocy & Watson, LLP

(57) ABSTRACT

According to an embodiment, an image forming apparatus having a function to erase an image formed on a recoding medium is provided. The image forming apparatus has an operation panel which, in a first mode in which an image forming process and an erasing process are not executable, accepts selection of any mode of a second mode in which the image forming process and the erasing process are executable, and a third mode in which the image forming process is not executable and the erasing process is executable.

7 Claims, 5 Drawing Sheets

IMAGE FORMING APPARATUS

CROSS-REFERENCE TO RELATED APPLICATION

This application is based upon and claims the benefit of priority from the prior Japanese Patent Application No. 2013-1323, filed on Jan. 8, 2013, the entire contents of which are incorporated herein by reference.

FIELD

Embodiments described herein generally relate to an image forming apparatus having a function to erase an image formed on a recording medium.

BACKGROUND

An image forming apparatus such as an MFP (Multi Function Peripheral) which forms an image on a recording medium such as a sheet has been proposed. In addition, in the image forming apparatus, an apparatus having an image forming process function to form an image using erasable coloring material such as erasable toner, and an erasing process function to erase the above-described image formed on a sheet has been developed.

In an image forming apparatus having an erasing process function, when a dormant state, that is a state of waiting for a process request from a user, continues for not less than a definite time, a control mode of the apparatus transfers from a ready mode in which various processes are executable, to a power saving mode in which power supply to the respective units of the apparatus is reduced, in the same manner as in an image forming apparatus not having an erasing process function. In addition, when the control mode returns from the power saving mode to the ready mode, the image forming apparatus performs a warming-up operation so as to make not only the erasing process but also the image forming process in an executable state. Accordingly, when a user returns the control mode of the image forming apparatus from the power saving mode to the ready mode, to use the erasing process function, it is necessary for the user to wait for a time required for the above-described warming-up, till the image forming apparatus becomes in the ready mode, in the same manner as in the case of using the image forming function.

DETAILED DESCRIPTION

According to an embodiment, an image forming apparatus having a function to erase an image is provided. The image forming apparatus has an image forming unit, an erasing unit, an operation panel, and a control unit. The image forming unit forms an image on a recording medium. The erasing unit erases an image formed on a recording medium. The operation panel, in a first mode in which an image forming process by the image forming unit and an erasing process by the erasing unit are not executable, accepts selection of any control mode of a second mode in which the image forming process and the erasing process are executable, and a third mode in which the image forming process is not executable and the erasing process is executable. The control unit controls the image forming unit and the erasing unit, in any control mode of the first mode, the second mode, and the third mode, in response to the selection of the control mode of the operation panel.

Figure 1:
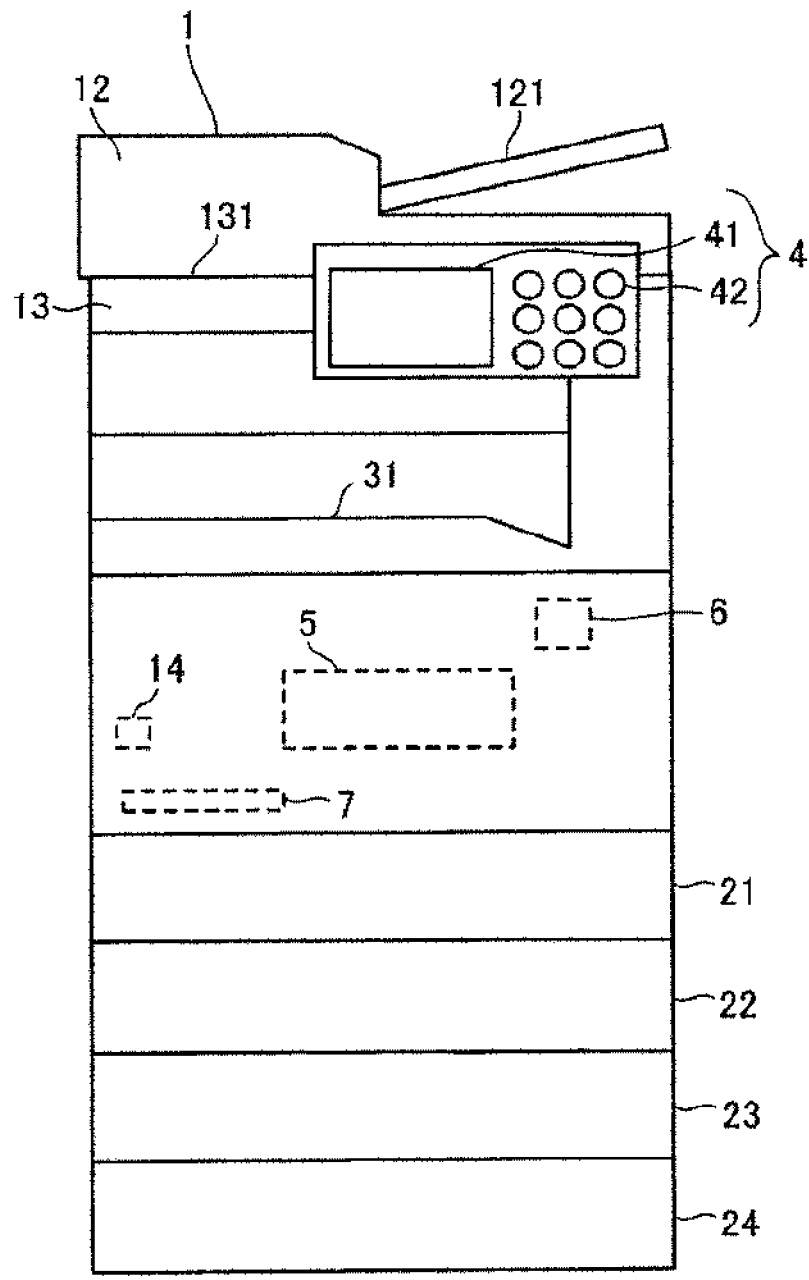
FIG. 1 is an appearance view showing an image forming apparatus according to a first embodiment.

Hereinafter, further embodiments will be described with reference to the drawings. In the drawings, the same symbols show the same or similar portions. An image forming apparatus of a first embodiment will be described with reference to FIG. 1. FIG. 1 is an appearance view showing an image forming apparatus 1 of the embodiment. The image forming apparatus 1 can perform an image forming process to form an image on a recording medium, such as a sheet using erasable coloring material, such as erasable toner, and an erasing process to erase an image of a sheet formed with erasable toner. The erasable toner is toner whose color is erased by heat, for example. The image forming apparatus 1 is an MFP, and can perform a scanning process, a FAX process, and so on, in addition to the above-described processes.

The image forming apparatus 1 has an ADF 12 (Auto Document Feeder), a scanner 13, sheet feeding cassettes 21-24, an empty sensor 25, a sheet discharge tray 31. In addition, the image forming apparatus 1 has a communication unit 14, an image forming unit 5, a fixing unit 6 serving also as an erasing unit, and a control unit 7.

The ADF 12 sends a sheet placed on an ADF tray 121 to the reading position of the scanner 13. The scanner 13 reads out an image of a sheet placed on a document table 131, and an image of the sheet conveyed from the ADF tray 121 to the reading position. The communication unit 14 communicates with an external device on a network by wireless or through cable communication.

Each of the sheet feeding cassettes 21-24 houses a sheet in a loaded state, so as to supply the sheet that is an image forming process target or an erasing process target to the above-described image forming unit 5 and the fixing unit 6. The sheet of the image forming process target is a sheet on which an image has not been formed. The sheet of the erasing process target is a sheet on which an image has been formed using erasable toner. A user houses a sheet of the erasing process target in the sheet feeding cassette 21, for example, and houses a sheet of the image forming process target in one of the sheet feeding cassettes 22-24, for example.

The sheet discharge tray 31 is provided inside the image forming apparatus 1, and has openings at a front face (front side on paper in FIG. 1) and a side face (left side in FIG. 1) of the image forming apparatus 1, so that a user can access the sheet discharge tray 31. The sheet discharge tray 31 houses an image-forming-processed sheet or an erasing-processed sheet in a loaded state inside the image forming apparatus 1.

An operation panel 4 has a display unit 41 of a touch panel type and operation keys 42. The display unit 41 displays setting information, operation status of the image forming apparatus 1, log information and a notice to a user. In addition, the display unit 41 accepts designation and so on of the condition for the process function of the image forming apparatus 1. Each of the operation key 42 accepts a process request to the image forming apparatus 1, such as a start instruction of the image forming process and a start instruction of the erasing process, by a user's input operation. FIG. 1 schematically shows the operation keys 42. The detail of the operation keys 42 will be described later.

The control unit 7 has a processor, an ASIC (Application Specific Integrated Circuit), a memory, and an HDD (Hard Disk Drive), and controls the whole of the image forming apparatus 1. The processor executes a program which the memory or the HDD stores, to realize the various functions of the image forming apparatus 1. The ASIC is a specific circuit for realizing a specific function, and may assume an appropriate function which the processor realizes.

Figure 2:
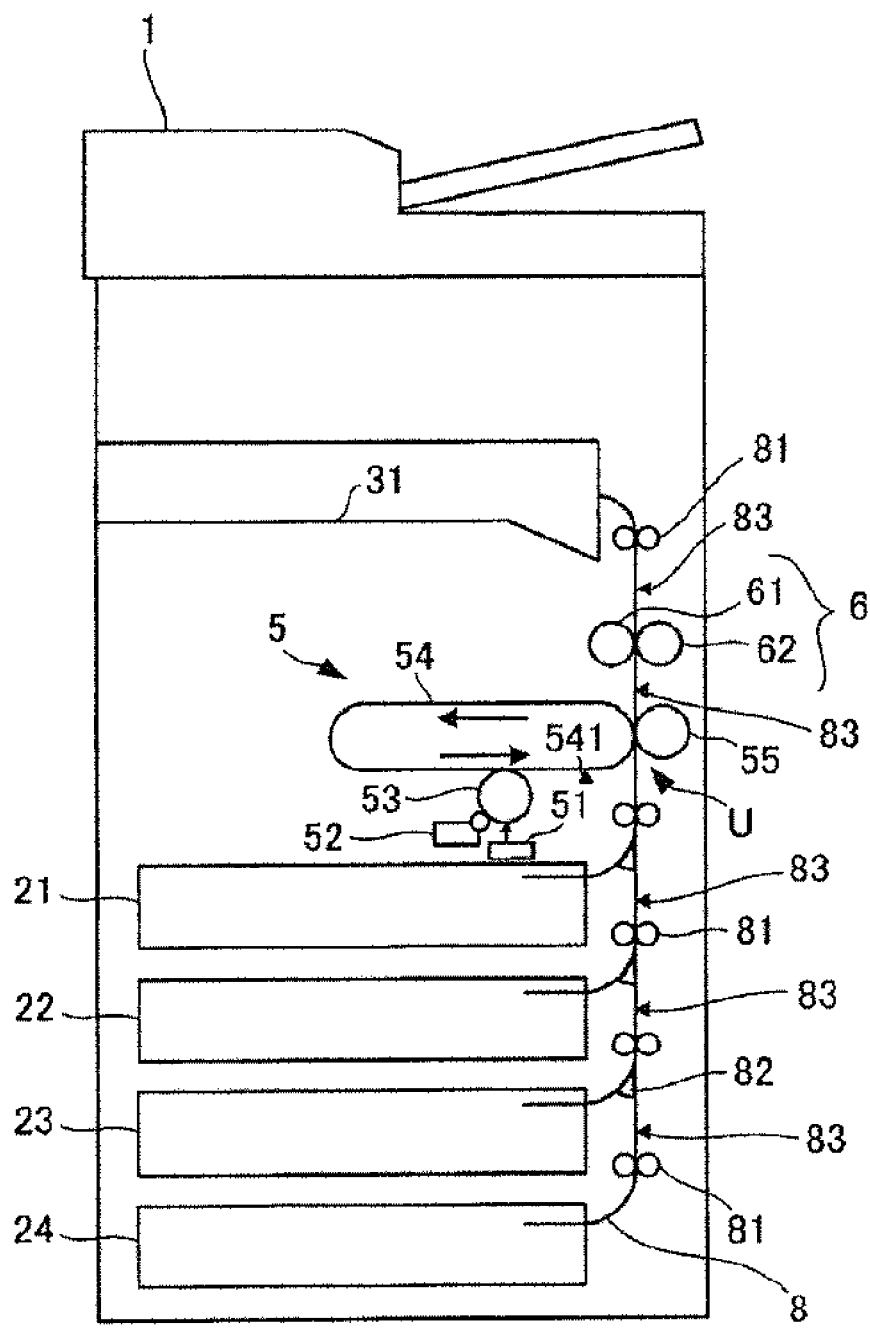
FIG. 2 is a sectional view showing a main portion of the image forming apparatus according to the first embodiment.

FIG. 2 is a sectional view showing a main portion of the image forming apparatus 1. The image forming apparatus 1 has an image sensor 541, and a conveying unit including a conveying path 8, in addition to the image forming unit 5 and the fixing unit 6. Hereinafter, the configuration of the respective units will be described.

The image forming unit 5 forms an image on a sheet that is an image forming process target. As shown in FIG. 2, the image forming unit 5 has a laser unit 51, a developing unit 52, and a photoconductor 53, a transfer belt 54 and a transfer roller which serve as an image carrier. The laser unit 51 performs exposure scanning of the photoconductor 53, based on data of the image read by the scanner 13, for example, and forms an electrostatic latent image on the photoconductor 53.

The developing unit 52 supplies erasable toner to the photoconductor 53, to develop the electrostatic latent image, and forms an image with erasable toner on the photoconductor 53. Hereinafter, an image with erasable toner may be simply called a toner image sometimes. The erasable toner includes a color developing compound, a color developer, and a decoloring agent, for example. As the color developing compound, a leuco dye which generates a blue color is used, for example. As the color developer, phenols are used, for example. As the decoloring agent, material which is compatible with the color developing compound when heated, and does not have affinity with the color developer, is used. The erasable toner generates color by mutual interaction of the color developing compound and the color developer, and the mutual interaction of the color developing compound and the color developer is cut when heated to not less than an erasing temperature, and thereby the erasable color is decolored.

Regarding the photoconductor 53, the outer circumference face is composed of a photoconductive surface such as an OPG (Organic Photo Conductor). The photoconductor 53 supports the toner image on the photoconductive surface, and rotates in the clockwise direction in FIG. 2. The transfer belt 54 is provided in contact with the photoconductor 53. The transfer belt 54 is supported in an endless ring shape by a roller (not shown), and rotates in the counterclockwise direction in FIG. 2. The transfer belt rotates, while supporting the toner image which is primarily transferred from the photoconductor 53, to convey the toner image to a position facing the transfer roller 55. The transfer belt 54 transfers the toner image on a sheet that is an image forming process target in cooperation with the transfer roller 55. Hereinafter, the position where the transfer roller 55 and the transfer belt 54 face to each other is called a secondary transfer position U.

The image sensor 541 detects the position and concentration of the toner image which is primarily transferred from the photoconductor 53 to the transfer belt 54. The transfer roller 55 makes contact with the transfer belt 54 at the secondary transfer position U, and conveys a sheet conveyed from one of the sheet feeding cassettes 21-24, while interposing the sheet between the transfer belt 54.

The conveying path 8 connects the sheet feeding cassettes 21-24, the secondary transfer position U, the fixing unit 6, and the sheet discharge tray 31, and guides a sheet from one of the sheet feeding cassettes 21-24 to the sheet discharge tray 31. The image forming apparatus 1 has the conveying unit including conveying rollers 81, flappers 82, so as to convey a sheet along the conveying path 8. The flappers 82 guide sheets taken out from the respective sheet feeding cassettes 21-24 to the conveying path 8. A plurality of the conveying rollers 81 are provided along the conveying path 8, and convey a sheet taken out from one of the sheet feeding cassettes 21-24 to the sheet discharge tray 31 through the secondary transfer position U and the fixing unit 6. In addition, the image forming apparatus 1 has a plurality of sheet detecting sensors 83 which are respectively arranged at prescribed positions of the conveying path 8. The sheet detecting sensors 83 respectively detect whether or not a sheet exists at the above-described prescribed positions in the conveying path 8, so as to detect sheet jamming in the conveying path 8, for example. In addition, the image forming apparatus 1 has pickup rollers (not shown) to take out sheets from the respective sheet feeding cassettes 21-24.

When the image forming apparatus 1 performs an image forming process, the above-described conveying unit of the image forming apparatus 1 conveys a sheet taken out from one of the sheet feeding cassettes 21-24 respectively housing sheets of image forming process targets, to the secondary transfer position U. At the secondary transfer position U, the transfer belt 54 and the transfer roller 55 cooperatively transfer the toner image on the sheet.

The fixing unit 6 is composed of a heating unit having a heating roller 61 and a pressure roller 62. The pressure roller 62 makes contact with the heating roller 61, and conveys a sheet while interposing the sheet between the heating roller 61. The heating roller 61 and the pressure roller 62 have heaters inside thereof, respectively, for example. When the image forming apparatus 1 performs the image forming process, the fixing unit 6 is controlled by the control unit 7, so that a heating temperature becomes a fixing temperature, that is 150° C.-160° C., for example. The fixing unit 6 heats the sheet at the fixing temperature and pressurizes it, to fix the toner image on the sheet.

When the image forming apparatus 1 performs an erasing process, the above-described conveying unit of the image forming apparatus 1 conveys a sheet taken out from one of the sheet feeding cassettes 21-24 respectively housing sheets of erasing process targets, to the fixing unit 6 through the secondary transfer position U. When the image forming apparatus 1 performs the erasing process, the fixing unit 6 functions as the erasing unit. The fixing unit 6 heats the sheet at an erasing temperature higher than the above-described fixing temperature, that is 170° C.-180° C., for example, and pressurizes it, to erase the toner image of the sheet. Specifically, the fixing unit 6 decolors the erasable toner forming the toner image of the sheet, to erase the toner image. The above-described conveying unit of the image forming apparatus 1 discharges the image-forming-processed sheet or the erasing-processed sheet to the sheet discharge tray 31.

Figure 3:
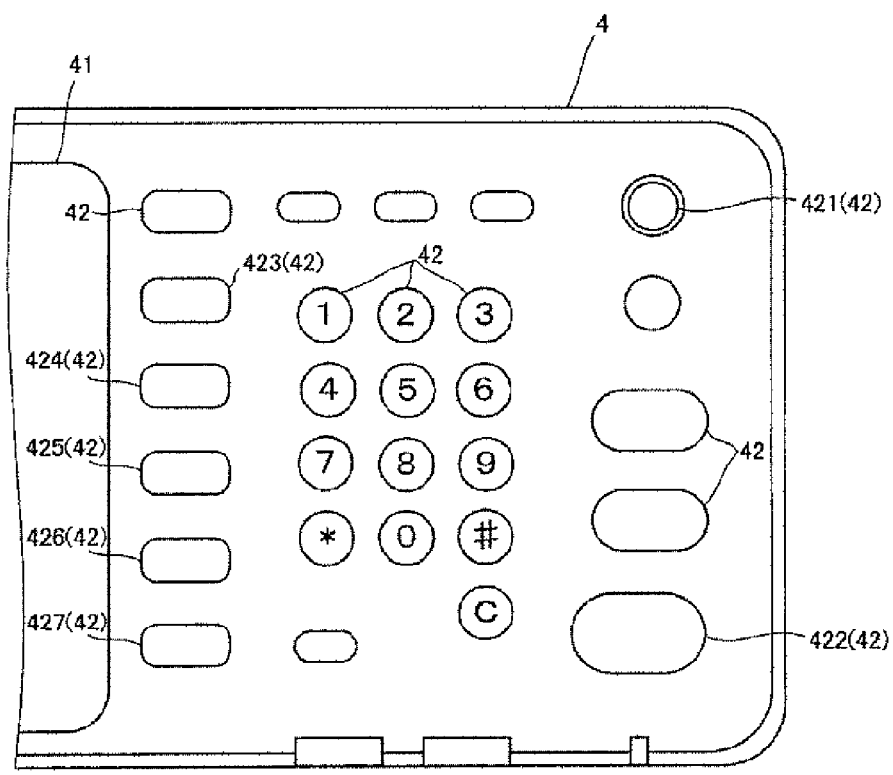
FIG. 3 is an enlarged vies view of the operation keys of the image forming apparatus according to the first embodiment.

FIG. 3 is an enlarged view showing the operation keys of the image forming apparatus 1. Hereinafter, a plurality of control modes including power control by the control unit 7 will be described. In addition, transfer controls between the respective control modes by the control unit 7 based on the acceptance of a user operation by the operation keys 42 will be described.

The control modes by the control unit 7 have a power saving mode that is a first mode, a normal ready mode that is a second mode, and an erasing ready mode that is a third mode. The power saving mode is a control mode in which the image forming process and the erasing process are not executable, so as to reduce power supply to the image forming unit 5 and the fixing unit 6, for example. The normal ready mode is a control mode in which the image forming process and the erasing process are executable. The erasing ready mode is a control mode in which the image forming process not executable, but the erasing process is executable.

The operation keys 42 of the operation panel 4 have a power source button 421, a start button 422, an erasing button 423, a scan button 424, an image forming button 425, a filing box button 426, and a fax button 427, for example. When the power source of the image forming apparatus 1 is OFF, and the power source button 421 is pressed by a user, the power source of the image forming apparatus 1 is turned ON.

When the power source of the image forming apparatus 1 is turned ON, the control unit 7 makes the image forming apparatus 1 perform a warming-up operation, so as to make the image forming apparatus 1 in a normal ready state in which the image forming process and the erasing process are executable. The warming-up operation includes a calibration operation, a registration operation, a temperature raising operation of the fixing unit 6, and a sheet jamming detecting operation. When the warming-up operation is finished, the image forming apparatus 1 becomes in the above-described normal ready state. In other words, the control mode by the control unit 7 becomes the above-described normal ready mode.

The calibration operation is an operation for correcting the concentration of an image formed by the image forming unit 5. In order to approximate gradation values of image forming data as reference values, and actual gradation values of images formed based on the gradation values, to a proportional relation over a gradation region (gradation values 0-255, for example), the control unit 7 corrects the above-described gradation values of the image forming data using a gamma correction curve. The gamma correction curve is a function to prescribe the relation between gradation values before correction and gradation values after correction. For the calibration operation, the control unit 7 makes the image forming unit 5 form a plurality of patch images on the transfer belt 54, based on a plurality of different gradation values. The control unit 7 makes the image sensor 541 read the concentrations of the respective patch images. The control unit 7 corrects the gamma correction curve based on the read values.

The image forming apparatus 1 has the configuration which forms an image of one color using one photoconductor 53, but may have a configuration which forms an image of a plurality of colors. When an image of a plurality of colors is formed, a configuration may be used in which a plurality of the photoconductors 53 are provided along the transfer belt 54. When the image forming apparatus 1 has a plurality of the photoconductors 53 for a plurality of colors, the control unit 7 makes the image forming unit 5 form a patch image of each color on the transfer belt 54 using each of the photoconductors 53. The control unit 7 makes the image sensor 541 read the concentration of the patch image of each color. The control unit 7 corrects the gamma correction curve for each color based on this read value.

The registration operation is an operation so as to correct misregistration of an image transferred to a sheet by the image forming unit 5. The above-described misregistration includes misregistration in a sub scanning direction (a sheet conveying direction) caused by a rotational error of the photoconductor 53 or the transfer belt 54, for example, and misregistration in a scanning direction (a direction orthogonal to the sheet conveying direction) caused by meander of the transfer belt 54. When the above-described image of the plurality of colors formed, the above-described misregistration includes the misregistration between the images formed using photoconductors 53 for the respective colors which are arranged along the above-described transfer belt 54. For the registration operation, the control unit 7 makes the image forming unit 5 form a registration pattern on the transfer belt 54. The control unit 7 makes the image sensor 541 read the position of the above-described pattern. The control unit 7 corrects the above-described misregistration based on the position of the above-described read pattern. When the image forming apparatus 1 has the above-described photoconductors 53 for the respective colors, the control unit 7 makes the image forming unit 5 form registration patterns for the respective colors. The control unit 7 makes the image sensor 541 read the positions of the patterns of the respective colors, to correct misregistrations between the images of the respective colors.

The temperature raising operation of the fixing unit 6 the warming-up operation is an operation in which the control unit 7 raises a heating temperature of the fixing unit 6 to a standby temperature close to a fixing temperature (150-160° C., for example), when an image forming process request is accepted in the normal ready mode, so that the image forming apparatus 1 quickly performs the image forming process. The standby temperature is a temperature (130-150° C., for example) that is a little lower than the fixing temperature (150-160° C., for example), for example. In the normal ready mode, the control unit 7 maintains the above-described standby temperature. When an image forming process request is accepted in the normal ready mode, and the fixing process is performed, the control unit 7 raises the heating temperature of the fixing unit 6 to the fixing temperature (150-160° C., for example).

The sheet jamming detecting operation in the warming-up operation is an operation in which the control unit 7 judges whether or not sheet jamming is generated at the respective positions inside the image forming apparatus 1 using the detection result of the sheet jamming detecting sensors 83 which are provided at the respective positions of the conveying path 8.

When the above-described warming-up operation is finished, the control mode by the control unit 7 transfers to the normal ready mode. In other words, the image forming apparatus 1 transfers in the ready state in which the image forming process and the erasing process are executable. In the normal ready mode, the control unit 7 controls the fixing unit 6 so as to maintain the heating temperature of the fixing unit 6 to the standby temperature. In the normal ready mode, the control unit 7 controls the operation panel 4, so that the operation keys 42 such as the erasing button 423, the image forming button 425, the filing box button 426, the fax button 427 accept a user's operation. The user operates the operation panel 4, to select the process function to be used out of the process functions of the image forming apparatus 1. Furthermore, the user operates the operation panel 4, to make the image forming apparatus 1 perform the selected process function.

The operation keys 42 accept a selection and an execution instruction of the process function of the image forming apparatus 1, by the operation of the operation keys 42 by a user. The control unit 7 makes the respective units of the image forming apparatus 1 operate, in response to the selection and the execution instruction of the process function by the operation keys 42, so as to perform the process function selected by the user.

For example, when a user presses the image forming button 425 as the process function to be used, in the normal ready mode, the image forming button 425 accepts the selection of the image forming process function, as the process function of the image forming apparatus 1. In addition, when the user presses the start button 422, the start button 422 accepts the execution instruction of the image forming process function. Judging that the operation panel 4 has accepted a process request of the image forming process function, the control unit 7 makes the image forming unit 5 and the fixing unit 6 operate. The image forming unit 5 transfers the toner image to the sheet of the image forming process target. The fixing unit 6 fixes the toner image of the sheet to the sheet. At the time of the fixing process, the control unit 7 controls the fixing unit 6 so as to raise the heating temperature of the fixing unit 6 from the standby temperature to the fixing temperature. The fixing unit 6 heats the image of the sheet at the above-described fixing temperature and pressurizes it, to perform the fixing process of the toner mage.

Furthermore, when a user presses the erasing button 423 as the process function to be used in the normal ready mode, for example, the erasing button 423 accepts the selection of the erasing process function as the process function of the image forming apparatus 1. In addition, when the user presses the start button 422, the start button 422 accepts the execution instruction of the erasing process function. Judging that the operation panel 4 has accepted a process request of the erasing process function, the control unit 7 makes the fixing unit 6 operate. The fixing unit 6 decolors the image of the sheet of the erasing process target, to erase the image. At the time of the erasing process, the control unit 7 controls the fixing unit 6 so as to raise the heating temperature of the fixing unit 6 from the standby temperature to the erasing temperature (170-180° C., for example). The fixing unit 6 heats the image of the sheet at the above-described erasing temperature and pressurizes it, to erase the image.

In the normal ready mode, when a dormant state in which process requests by the operation panel 4 of the scanning process, the fax process, the image forming process, the erasing process, and so on have not been accepted, continues for not less than a definite time, the control mode by the control unit 7 transfers from the normal ready mode to the power saving mode. In the power saving mode, since power supply to the image forming unit 5 and the fixing unit 6 is a reduced state, the image forming apparatus 1 can not perform the image forming process and the erasing process.

Figure 4:
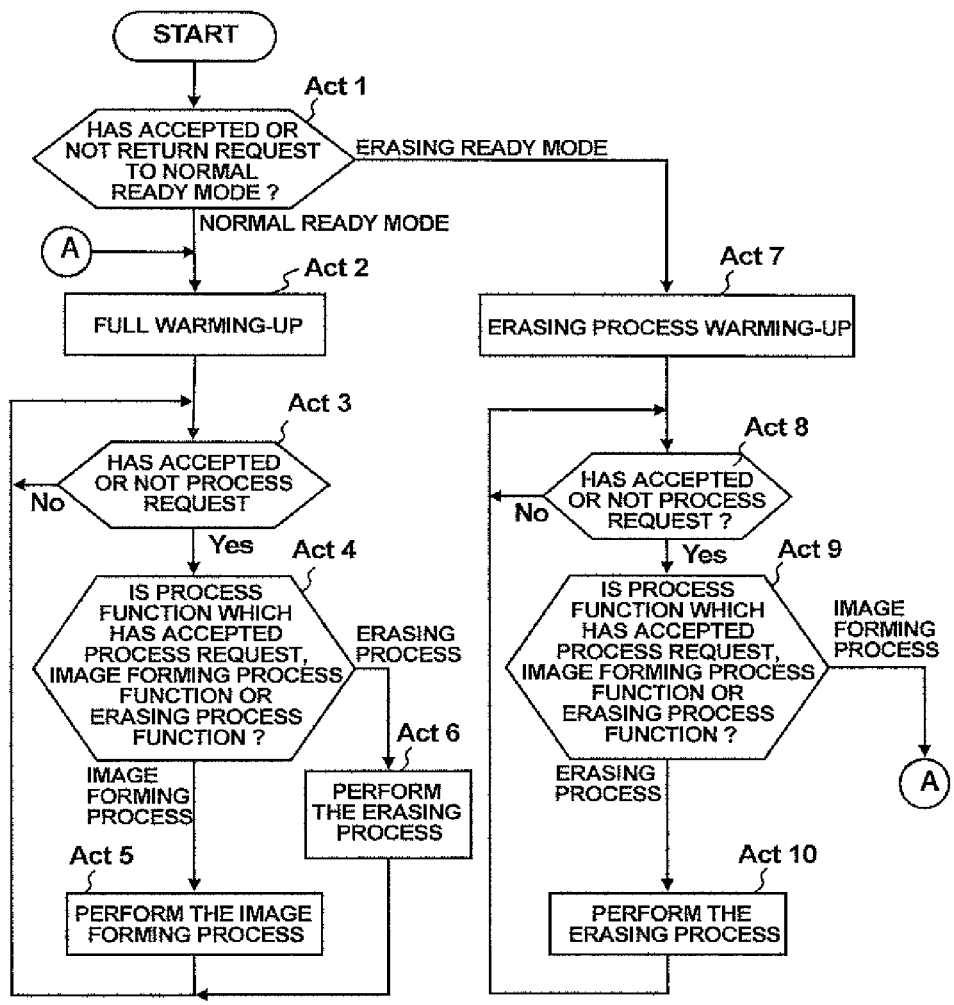
FIG. 4 is a flow chart showing a return control from a power saving mode in the image forming apparatus according to the first embodiment.

Hereinafter, a return control from the power saving mode to the normal ready mode or the erasing ready mode will be described with reference to a flow chart of FIG. 4. In the power saving mode, when a user wants to return the control mode by the control unit 7 of the image forming apparatus 1 to the normal ready mode in which the image forming process and the erasing process are executable, the user presses the start button 422 (FIG. 3) or the power source button 421 (FIG. 3), for example. When the start button 422 or the power source button 421 is pressed, the operation panel 4 accepts a return request to the above-described normal ready mode. In an Act 1, when the control unit 7 judges that the operation panel 4 has accepted the return request to the above-described normal ready mode, the operation of the image forming apparatus 1 proceeds to an Act 2. In the Act 2, the control unit 7 makes the image forming unit 5 and the fixing unit 6 operate which are related to the warming-up operation required for execution of the image forming process and the erasing process. The image forming apparatus 1 performs the above-described warming-up operation. After the above-described warming-up operation is finished, the control mode by the control unit 7 of the image forming apparatus 1 returns from the power saving mode to the normal ready mode. In other words, the image forming apparatus 1 transfers to the ready state in which the image forming process and the erasing process are executable.

The warming-up operation required for execution of the image forming process includes the above-described calibration operation, the registration operation, the temperature raising operation of the fixing unit 6, and the sheet jamming detecting operation. When the image forming apparatus 1 performs only the erasing process, the calibration operation to perform the correction of the image concentration, and the registration operation to correct the misregistration of the image are unnecessary, as the warming-up operation of the image forming apparatus 1. Since the warming-up operation required for execution of the image forming process includes the warming-up operation which is unnecessary in the case of execution of only the erasing process, the warming-up operation required for execution of the image forming process will be called a full warming-up operation below. In the full warming-up operation, the control unit 7 controls the fixing unit 6 so as to raise the heating temperature of the fixing unit 6 to the standby temperature (130-150° C., for example), and to maintain the heating temperature at the above-described standby temperature after returning to the normal ready mode.

When the image forming apparatus 1 performs only the erasing process, the calibration operation and the registration operation described above are unnecessary, as the warming-up operation. Hereinafter, the warming-up operation required for execution of only the erasing process will be called an erasing process warming-up operation. The erasing process warming-up operation includes the temperature raising operation of the fixing unit 6 and the sheet jamming detecting operation, and does not include the calibration operation and the registration operation.

After the control mode returns to the normal ready mode, the control unit 7 waits for acceptance of a process request by the operation panel 4 in an Act 3. In the Act 3, when the control unit 7 judges that the operation panel 4 has accepted the process request (Yes in Act 3), the operation of the image forming apparatus 1 proceeds to an Act 4. In the Act 4, the control unit 7 judges the kind of the process function which has accepted the above-described process request. In the Act 4, when the control unit 7 judges that the process function which has accepted the above-described process request is the image forming process function, the operation of the image forming apparatus 1 proceeds to an Act 5. In the Act 5, the control unit 7 makes the image forming unit 5 and the fixing unit 6 and so on operate, so as to make the image forming apparatus 1 perform the image forming process. The image forming unit 5 transfers the toner image to the sheet of the image forming process target. The fixing unit 6 heats the toner image of the sheet and pressurizes it, to fix the toner image on the sheet. At the time of the fixing process, the control unit 7 controls the fixing unit 6 so as to raise the heating temperature of the fixing unit 6 from the standby temperature (130-150° C., for example) to the fixing temperature (150-160° C., for example). When the image forming process of the above-described Act 5 is finished, the operation of the image forming apparatus 1 returns to the Act 3.

After the control mode returns to the normal ready mode, in the case of accepting the erasing process request, in other words, when the control unit 7 judges that the process function which has accepted the above-described process request is the erasing process function in the above-described Act 4, the operation of the image forming apparatus 1 proceeds to an Act 6. In the Act 6, the control unit 7 makes the fixing unit 6 serving also as the erasing unit operate, so as to make the image forming apparatus 1 perform the erasing process. The fixing unit 6 heats the sheet of the erasing process target and pressurizes it, to erase the image of the sheet. At the time of the erasing process, the control unit 7 controls the fixing unit 6 so as to raise the heating temperature of the fixing unit 6 from the standby temperature (130-150° C., for example) to the erasing temperature (170-180° C., for example). When the erasing process of the above-described Act 6 is finished, the operation of the image forming apparatus 1 returns to the Act 3.

In the power saving mode, when a user wants to return the control mode of the image forming apparatus 1 to the erasing ready mode in which the image forming process is not executable but the erasing process is executable, the user presses the erasing button 423 (FIG. 3). In the above-described Act1, when the erasing button 423 is pressed, the operation panel 4 accepts the return request to the above-described erasing ready mode. When the control unit 7 judges that the operation panel 4 has accepted the return request to the above-described erasing mode, the operation of the image forming apparatus 1 proceeds to an Act 7. In the Act 7, the control unit 7 makes the fixing unit 6 operate which is related to the above-described erasing process warming-up operation. The image forming apparatus 1 performs the above-described erasing process warming-up operation. After the above-described erasing process warming-up operation is finished, the control mode by the control unit 7 returns to the erasing ready mode. In other words, the image forming apparatus 1 transfers to the ready state in which the erasing process is executable.

The erasing process warming-up operation includes the temperature raising operation of the fixing unit 6 and the sheet jamming detecting operation, but does not include the calibration operation and the registration operation which are required before the image forming process, as described above. Also in the erasing process warming-up operation, the control unit 7 controls the fixing unit 6 so as to raise the heating temperature of the fixing unit 6 to the standby temperature (130-150° C., for example).

After the control mode returns to the erasing ready mode, the control unit 7 waits for acceptance of a process request by the operation panel 4 in an Act 8. In the Act 8, when the control unit 7 judges that the operation panel 4 has accepted the process request (Yes in Act 8), the operation of the image forming apparatus 1 proceeds to an Act 9. In the Act 9, the control unit 7 judges the kind of the process function which has accepted the above-described process request. In the Act 9, when the control unit 7 judges that the process function which has accepted the above-described process request is the erasing process function, the operation of the image forming apparatus 1 proceeds to an Act 10. In the Act 10, the control unit 7 controls the fixing unit 6 so as to raise the heating temperature of the fixing unit 6 from the standby temperature (130-150° C., for example) to the erasing temperature (170-180° C., for example). The fixing unit 6 heats the sheet of the erasing process target at the above-described erasing temperature and pressurizes it, to erase the image of the sheet. When the erasing process of the above-described Act 10 is finished, the operation of the image forming apparatus 1 returns to the Act 8.

After the control mode returns to the erasing ready mode, in the case of accepting the image forming process request, in other words, when the control unit 7 judges that the process function which has accepted the above-described process request is the image forming process, in the above-described Act 9, the operation of the image forming apparatus 1 returns to the above-described Act 2. In the Act 2, the image forming apparatus 1 performs the above-described full warming-up operation. Since the control unit 7 previously judges that the operation panel 4 has accepted the easing process request, after the full warming-up operation in the Above-described Act 2, the operation of the image forming apparatus 1 passes through the Above-described Act 3 and the Above-described Act 4, and proceeds to the above-described Act 5. In the above-described Act 5, the image forming apparatus 1 performs the image forming process, as described above.

In the power saving mode, when a user who wants to use the erasing process function presses the erasing button 423, the control unit 7 performs the erasing process warming-up operation which does not include the calibration and so on unnecessary for the erasing process. After the erasing process warming-up operation is finished, the control mode of the control unit 7 returns to the erasing ready mode. Accordingly, according to the present embodiment, it is possible to quickly make the image forming apparatus 1 in a ready state in which the erasing process is executable, without generating a useless waiting time to a user who wants to use only the erasing process function. In addition, according to the present embodiment, when the control mode by the control unit 7 returns from the power saving mode to the erasing ready mode, since the calibration operation and so on are not performed, useless toner consumption is not also generated. In addition, according to the present embodiment, in the power saving mode, since a user operates only the operation key 42, to select either control mode of the normal ready mode or the erasing ready mode, as the control mode at the time of returning from the power saving mode, it is not necessary to previously set the control mode at the time of returning from the power saving mode, and the present embodiment can improve convenience.

Hereinafter, an image forming apparatus according to a second embodiment will be described. Since the image forming apparatus according to the second embodiment has the configuration shown in FIG. 1 to FIG. 3 in the same way as the first embodiment, the image forming apparatus according to the second embodiment will also be described below, by citing the same symbols as in the first embodiment. The image forming apparatus 1 according to the second embodiment is different from the first embodiment, in a selecting method of the control by a user mode at the time of returning from the power saving mode. The image forming apparatus 1 of the first embodiment, in the above-described Act 1 of the return control shown in FIG. 4, accepts selection of the control mode by a user at the time of returning from the power saving mode, by an operation input of the operation key 42. On the other hand, the image forming apparatus 1 of the second embodiment, in the above-described Act 1, displays a setting screen 9 for selecting a control mode at the time of the above-described return on the display unit 41, and accepts selection of the control mode by a user, by a touch operation of the user in the setting screen 9.

Figure 5:
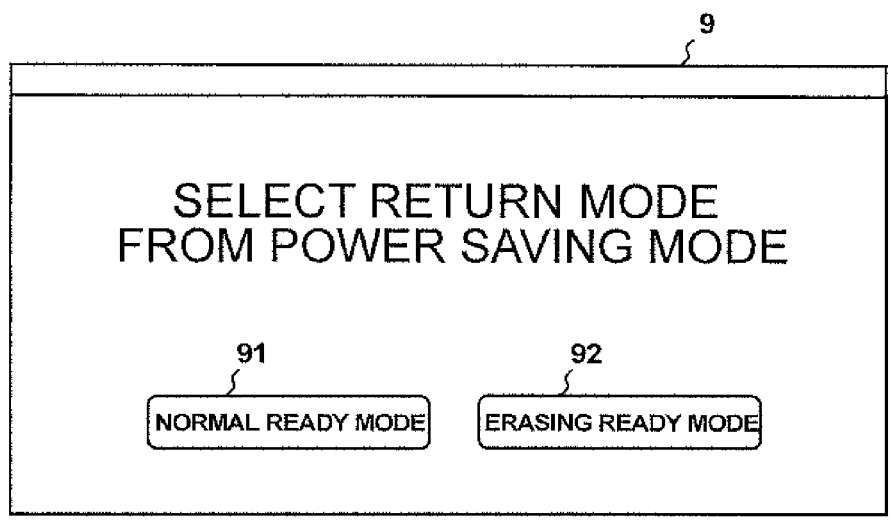
FIG. 5 is view showing a setting screen to select a control mode at the time of returning from a power saving mode in an image forming apparatus according to a second embodiment.

The setting screen 9 will be described with reference to FIG. 5. FIG. 5 is a diagram showing the setting screen 9 which is displayed on the display unit 41 of the image forming apparatus 1 of the second embodiment. As shown in FIG. 5, the setting screen 9 includes a normal ready mode button 91 and an erasing ready mode button 92. In addition, guidance for stimulating a user to perform a touch operation of any button of the normal ready mode button 91 and the erasing ready mode button 92 is displayed on the setting screen 9. The display unit 41, as the above-described guidance, displays a wording such as "select return mode from power saving mode", for example, on the setting screen 9.

The return control from the power saving mode in the image forming apparatus 1 of the second embodiment will be described with reference to FIG. 4. In the above-described Act 1, the control unit 7 controls the display unit 41 so as to display the setting screen 9. Furthermore, in the above described Act 1, the control unit 7 judges whether any button of the above-described normal ready mode button 91 and the erasing ready mode button 92 has accepted a touch operation by a user. When the control unit 7 judges that the above-described normal ready mode button 91 has accepted the touch operation by the user, the operation of the image forming apparatus 1 proceeds to the Act 2. In the Act 2, the image forming apparatus 1 performs the full warming-up operation, and then returns to the normal ready mode. In addition, when the control unit 7 judges that the above-described erasing ready mode button 92 has accepted the touch operation by the user, the operation of the image forming apparatus 1 proceeds to the Act 7. In the Act 7, the image forming apparatus 1 performs the erasing process warming-up operation, and then returns to the erasing ready mode. The control of the above-described Act 2 and after, and the control of the above-described Act 7 and after in FIG. 4 are the same as in the first embodiment.

In the above-described embodiments, the control unit 7, at the time of the normal ready mode, the heating temperature of the fixing unit 6 at the fixing standby temperature lower than the fixing temperature, and raises the heating temperature of the fixing unit 6 to the fixing temperature, at the time of performing the fixing process when the image forming process request is accepted, but when one which can rapidly raise the heating temperature of the fixing unit 6 is used, as a heater of the fixing unit 6, it is not necessary to keep the fixing unit 6 at the standby temperature in the normal ready mode. In addition, when one which can rapidly raise the heating temperature of the fixing unit 6 is used, as a heater of the fixing unit 6, it is not necessary to raise the heating temperature of the fixing unit 6, in the full warming-up operation and the erasing process warming-up operation.

In the above-described embodiments, the fixing unit 6 serves also as the erasing unit to erase an image of a sheet, but the erasing unit may be configured as a separate unit from the fixing unit.

In the above-described embodiments, the configuration is used in which the toner that is decolored by heat is used as the erasable toner, and the erasing unit decolors a toner image by giving heat to a sheet. But, a configuration may be used in which photolytic toner that is decomposed by being irradiated with light such as near infrared rays is used as the erasable toner, and the erasing unit decomposes a toner image by irradiating a sheet with the light such as the near infrared rays. In addition, a configuration may be used in which one that is separated from a sheet by being dipped in process liquid is used as the erasable toner, and the erasing unit separates a toner image from a sheet by making the sheet to be dipped in the process liquid. In addition, the transfer belt 54 may be eliminated, and the image forming apparatus may be configured to directly transfer a toner image to a sheet from the photoconductor 53.

In the above-described embodiments, the image forming process means a series of processes which takes out a sheet from one of the sheet feeding cassettes 21-24, transfers an image on the sheet by the transfer unit 5, and fixes the image on the sheet by heating and pressurizing the sheet by the fixing unit 6. The case to perform the image forming process means any timing or term during the relevant series of processes. In the case of performing the image forming process, a timing in which the temperature of the fixing unit 6 is raised to the fixing temperature is any timing during the term from a time when a sheet is fed to the conveying path 8 to a time just before the sheet reaches the fixing unit 6, and may be a timing just before the sheet reaches the fixing unit 6, for example.

In the above-described embodiments, the erasing process means a series of processes which takes out a sheet from one of the sheet feeding cassettes 21-24, and decolors an image with erasable toner on the sheet by heating and pressurizing the sheet by the fixing unit 6. The case to perform the erasing process means any timing or term during the relevant series of processes. In the case of performing the erasing process, a timing in which the temperature of the fixing unit 6 is raised to the erasing temperature is any timing during the term from a time when a sheet is fed to the conveying path 8 to a time just before the sheet reaches the fixing unit 6, and may be a timing just before the sheet passes through the fixing unit 6, for example.

The sequence of the respective processes in the above-described embodiments may be different from the sequence exemplified by the above-described embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. In an image forming apparatus having a function to erase an image; the image forming apparatus comprising:
   an image forming unit to form an image on a recording medium;
   a fixing unit to heat the image at a fixing temperature to fix the image on the recording medium and heat a formed imaged at an erasing temperature higher than the fixing temperature to erase the formed image;
   an operation panel which, in a first mode in which an image forming process by the image forming unit and an erasing process by the fixing unit are not executable, accepts selection of any control mode of a second mode in which the image forming process and the erasing process are executable, and a third mode in which the image forming process is not executable and the erasing process is executable;
   a control unit which controls the image forming unit and the fixing unit in any control mode of the first mode, the second mode, and the third mode, in response to the selection of the mode of the operation panel;
   wherein in response to the selection of the second mode, the control unit performs a warming-up operation for execution of the image forming process and the erasing process, the warming-up operation includes a calibration operation, a registration operation, and a temperature raising operation of the fixing unit; and
   wherein in response to the selection of the third mode, the control unit performs the warming-up operation without the calibration operation and the registration operation.

2. The image forming apparatus according to claim 1 wherein: the first mode is a control mode in which the control unit controls power supply, so that power supplied to the image forming unit and the erasing unit is reduced.

3. The image forming apparatus according to claim 2 wherein: after the warming-up operation necessary for execution of the image forming process and the erasing process is finished, the control mode by the control unit transfers from the first mode to the second mode.

4. The image forming apparatus according to claim 2 wherein: after the warming-up operation necessary for execution of the erasing process is finished, the control mode by the control unit transfers from the first mode to the third mode.

5. The image forming apparatus according to claim 2 wherein: the operation panel accepts execution requests of the image forming process and the erasing process, in the second mode and the third mode.

6. The image forming apparatus according to claim 5 wherein: after the warming-up operation necessary for execution of the image forming process is finished, the control mode by the control unit transfers from the second mode to the third mode.

7. The image forming apparatus according to claim 5 wherein: a state in which the operation panel does not accept the execution request continues for not less than a definite time, the control mode by the control unit transfers from the second mode or the third mode to the first mode.

\* \* \* \* \*